Figure 1:
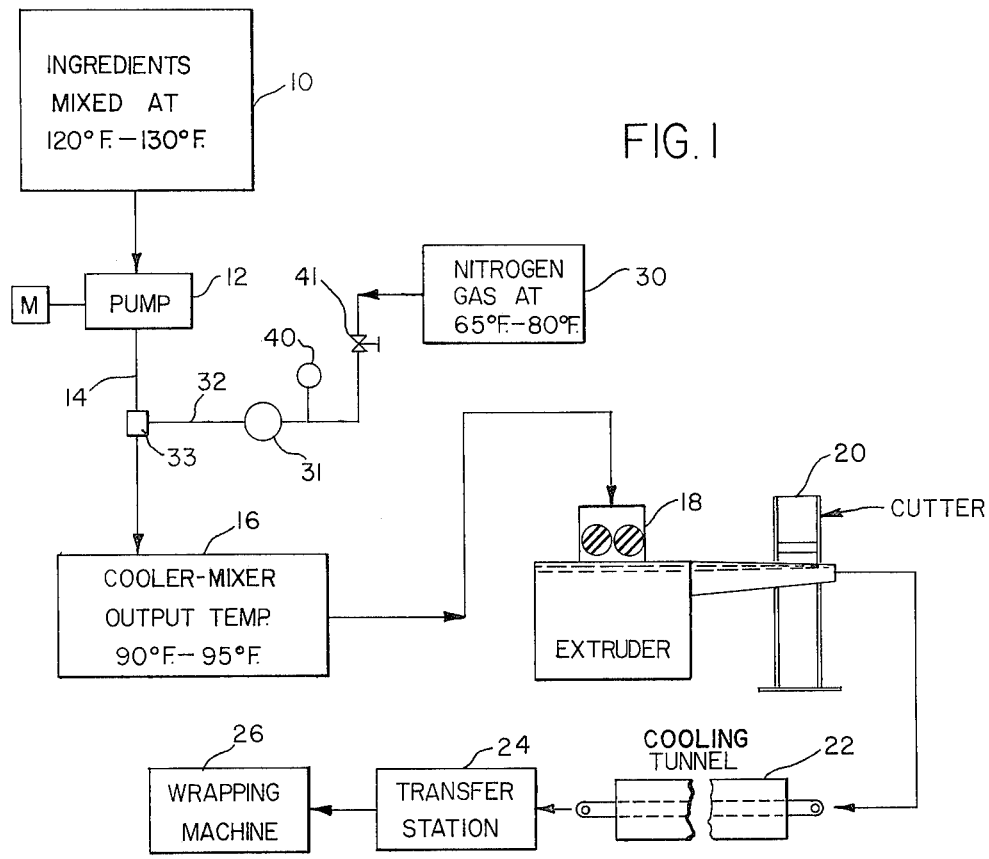

United States Patent [19]

Perryman

[11] 4,118,518
[45] Oct. 3, 1978

[54] METHOD OF PRODUCING CONCENTRATED SAUCE PRODUCT

[75] Inventor: E. Firth Perryman, Webster, N.Y.

[73] Assignee: The R.T. French Company, Rochester, N.Y.

[21] Appl. No.: 791,234

[22] Filed: Apr. 27, 1977

[51] Int. Cl.² .............................................. A23P 1/00
[52] U.S. Cl. ................................ 426/516; 264/176 R; 426/589
[58] Field of Search .................. 425/202, DIG. 39; 426/589, 511, 516, 524, 517, 802, 518, 453, 513, 454, 569, 572, 470; 264/202, 176 R

[56] References Cited

U.S. PATENT DOCUMENTS

| | | | |
|---|---|---|---|
| 2,391,829 | 12/1945 | Huber | 426/453 X |
| 3,012,893 | 12/1961 | Kremzher | 426/572 |
| 3,557,717 | 1/1971 | Chivers | 426/516 X |
| 3,707,380 | 12/1972 | Dunning et al. | 426/516 |
| 3,778,522 | 12/1973 | Strommer | 426/511 |
| 3,966,993 | 6/1976 | Luck | 426/589 |
| 3,985,910 | 10/1976 | Kirkpatrick | 426/572 |
| 4,001,457 | 1/1977 | Hegadorn | 426/572 |
| 4,038,424 | 7/1977 | Davies | 426/589 X |
| 4,060,645 | 11/1977 | Risler et al. | 426/589 X |

Primary Examiner—Kenneth M. Schor

[57] ABSTRACT

The ingredients of the concentrated sauce are heated and blended to form a fluid or pumpable mixture, which is pumped to a heat exchanger or cooler-mixer, where it resides for from 5 to 10 minutes. The somewhat cooled mixtue then passes through an extruder which forms it into solid 1 × 1 inch strips. These strips are then severed into approximately 1 × 1 inch × 3 inch chunks or bars, which are then packaged for marketing. Nitrogen gas, or the like, is pumped into the fluid concentrate before it enters the heat exchanger, and by controlling the rate of flow of the concentrate the gas is allowed to expand to several times its original volume as the mixture leaves the extruder, thereby unexpectedly increasing the uniformity of the final product.

7 Claims, 2 Drawing Figures

U.S. Patent      Oct. 3, 1978      4,118,518

METHOD OF PRODUCING CONCENTRATED SAUCE PRODUCT

This invention relates to concentrated food sauces, and more particularly to an improved method of producing such sauces in the form of small rectangular bars or chunks which disperse readily in water to produce an edible sauce or gravy.

There are several known processes for producing dry sauce bases or concentrates which can be added to water to produce sauces or gravies of predetermined flavor. Typically such concentrates are formed from mixtures containing edible fats, starches or starch derivatives and flavoring materials (condiments, etc.).

In certain processes of the type described it has been customary to mix the ingredients of the concentrate, and then to extrude the mixture through a machine which produces a plurality of elongate, solid strips. These strips are then severed into small chunks or bars, which are packaged for marketing. One of the major problems encountered with a process of this type, however, is that it heretofore has been extremely difficult to secure any uniformity in the extruded product, for instance with respect to density, uniformity, smoothness, etc.

It is an object of this invention, therefore, to provide an improved process of extruding sauce concentrates of the type described, which results in a substantially more uniform product regardless of the differences in the formulations of the concentrates.

It is still another object of this invention to provide an improved process of the type described during which gas under pressure is applied to the mixed ingredients before the extrusion thereof in order to lend improved fluidity and flowability to the product during extrusion.

A more specific object for this invention is to improve the process of producing bar-type sauce concentrates by injecting nitrogen or the like into the sauce mixture before it is extruded into its final form.

Figure 2:
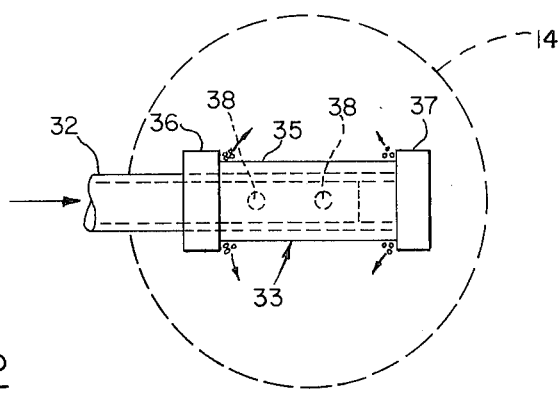

Other objects of the invention will be apparent hereinafter from the specification and from the recital of the appended claims, particularly when read in conjunction with the accompanying drawing. In the drawing:

FIG. 1 is a schematic flow diagram illustrating the various steps that are performed in the process of manufacturing a concentrated sauce product made according to one embodiment of this invention; and FIG. 2 is a fragmentary side view of one type of check valve which can be utilized in carrying out the process shown schematically in FIG. 1.

Referring now to the drawing, the ingredients that are to form the concentrated sauce (e.g. edible fats, starch and flavoring materials) are brought to a temperature of approximately 120° to 130° F. and mixed, as denoted at 10, to form a pumpable or fluid mixture. This mixture is pumped by a pump 12 at a pressure of from 70–100 lbs. per square inch gauge through a line 14 to a combination cooler-mixer or heat exchanger 16, the output of which is fed to an extruder 18. The mixture leaves the extruder 18 in the form of a plurality of solid rectangular 1 × 1 inch strips, which pass through a cutter 20 that severs the strips into a plurality of small bars approximately 1 × 1 × 3 inches. The bars are then passed through a cooling tunnel 22 to a transfer station 24, from where they are transferred to a wrapping machine 26 where the finished product is wrapped for marketing.

As the fluid mixture is being pumped to the cooler-mixer 16, a gas (e.g. nitrogen) under a pressure approximately 5 to 15 lbs. greater than that in line 14, is fed from a supply 30 thereof through a flow meter 31, line 32 and a check valve 33, to line 14, where the gas mixes with the fluid concentrate as noted hereinafter. The check valve 33, one form of which is shown by way of example in FIG. 2, is located at the point of entry of the nitrogen gas into the fluid stream passing through line 14, so that none of the fluid can enter the relatively cool nitrogen line and freeze and plug the line.

The check valve 33 should be of a design that is easy to clean. In the embodiment illustrated in FIG. 2, wherein the nitrogen supply pipe 32 has a plugged or closed end which extends sealingly into line 14, the valve comprises a 1½ inch length of ⅜ inch diameter plastic tubing 35 sold under the trademark "Tygon." This piece of tubing 35 is positioned between a pair of external circumferential shoulders 36 and 37, which are formed on the plugged end of the stainless steel supply pipe 32. Between its shoulders the pipe 32 has therein a plurality of openings 38 which convey nitrogen gas to the interior tube 35. This gas is then discharged in fine streams from opposite ends of tube 35 and into line 14 as illustrated by the tiny bubbles and arrows shown in FIG. 2.

The rate of flow of the liquid concentrate through the cooler mixer 16 is controlled by the pump 12, which may be a constant volume-type pump, and the speed of rotation of which is indicated by a meter M. In addition to the flow meter 31 the nitrogen line includes a pressure gage 40, and a needle valve 41 which is positioned upstream of the flow meter 31 for regulating the flow of nitrogen gas to line 14.

The pressure of the fluid upon discharge from the cooler-mixer is about 10 lbs. per square inch less than the pressure upon entering the cooler-mixer. The residence time in the cooler-mixer is about 5 to 10 minutes. The pressure drop through the cooler-mixer 16 tends to cause the nitrogen volume in the fluid to increase slightly. However, the temperature drop almost exactly counter-balances this effect so that the nitrogen volume remains essentially unchanged through the cooler-mixer, as shown, for example, by the following calculations:

$$v_2 = v_1 \times \frac{p1}{P2} \times \frac{T2}{T1} = 1 \times \frac{(80 + 15)}{(75 + 15)} \times \frac{(95 + 460)}{(130 + 460)} = 0.99$$

$v_1$ = unit volume of gas before cooler-mixer $P_1$ = pressure of mixture (gas and concentrate) before cooler-mixer = 80 psig + 15

$p_2$ = pressure of mixture after cooler-mixer = 75 psig + 15

$T_1$ = temperature of mixture before cooler-mixter = 130° F. + 460° F.

$T_2$ = temperature of mixture after cooler-mixer = 95° F. + 460° F.

$v_2$ = unit volume of gas after cooler-mixer

The nitrogen volume, however, does increase from the cooler-mixer 16 to the point where the fluid is discharged as a bar from the extruder 18, because the pressure drops from approximately 70 pounds per sq. in. gage at the cooler-mixer discharge to zero pounds per sq. in. gage at the extruder discharge. This is evidenced, for example, as follows:

$$v_3 = v_2 \times \frac{p_2}{p_3} = \frac{(75 + 15)}{(0 + 15)} = 6.0,$$

wherein $v_2$ is the unit volume of gas after the cooler-mixer and before the extruder, and $v_3$ is the unit volume of the gas after the extruder.

This expanding gas gives to the the extruding product a fluidity or flowability that is absent when no nitrogen is used. This improved fluidity not only surprisingly increases the uniformity in the extruded product, but also makes it possible to extrude at least certain product concentrates which heretofore could not be satisfactorily extruded into uniform bars.

From the foregoing it will be apparent that the instant invention provides extremely simple means for improving an extruding process of the type described, and in particular for improving the uniformity of the concentrated product produced by such a process. By using small amounts of gas under pressure it is possible to improve the reliability of the process and to enable it to be conducted in a continuous manner without interruption. The improved process also substantially eliminates undesirable, non-uniform products, which often resulted during the practice of prior, known methods of producing solid sauce products of the type described.

While the invention has been described in connection with the use of nitrogen gas, it is to be understood that similar inert or non-toxic gases such as carbon dioxide, compressed air, etc. could be employed in place of nitrogen. Likewise, while the invention has been described in connection with only a single embodiment thereof, it will be apparent that this application is intended to cover any such modifications that may be apparent to one skilled in the art, or which fall within the scope of the appended claims.

What I claim is:

1. In a method of producing a concentrated food product, wherein the ingredients of an edible food concentrate are mixed, pumped in fluid form to and through a heat exchanger, pumped to an extruder having a discharge at atmospheric pressure, extruded, and then cut into small pieces, the improvement comprising feeding a gas under pressure above atmospheric into the concentrate as it is being pumped to said exchanger, controlling the rate of flow of said concentrate through the heat exchanger so that the temperature and pressure of the concentrate are lowered as it passes through the exchanger, with the drop in temperature of the concentrate in the exchanger being controlled to offset the tendency of said gas in the concentrate to expand, whereby the volume of the gas added to the concentrate remains substantially constant until the concentrate is discharged from the exchanger, and allowing the volume of said gas to expand during passage of the concentrate through the extruder.

2. The process as defined in claim 1, wherein the residence time of the concentrate in said exchanger is in the range of approximately 5–10 minutes.

3. The process as defined in claim 2, wherein the pressure drop of the mixture in said exchanger between its inlet and discharge is approximately 10 psig.

4. The process as defined in claim 1, wherein the volume of said gas at the discharge of said extruder is approximately 5–6 times the volume of said gas at the inlet to said extruder.

5. The process as defined in claim 1, wherein said gas is selected from the group consisting of nitrogen, air and carbon dioxide.

6. The process as defined in claim 1, where said gas is fed into said concentrate at room temperature and at a pressure 5–15 psig. greater than the pressure of the concentrate being pumped to said exchanger.

7. The process as defined in claim 3, wherein the pressure drop of the mixture in said extruder between its inlet and discharge is approximately 70 psig.

* * * * *